Patented Nov. 21, 1922.

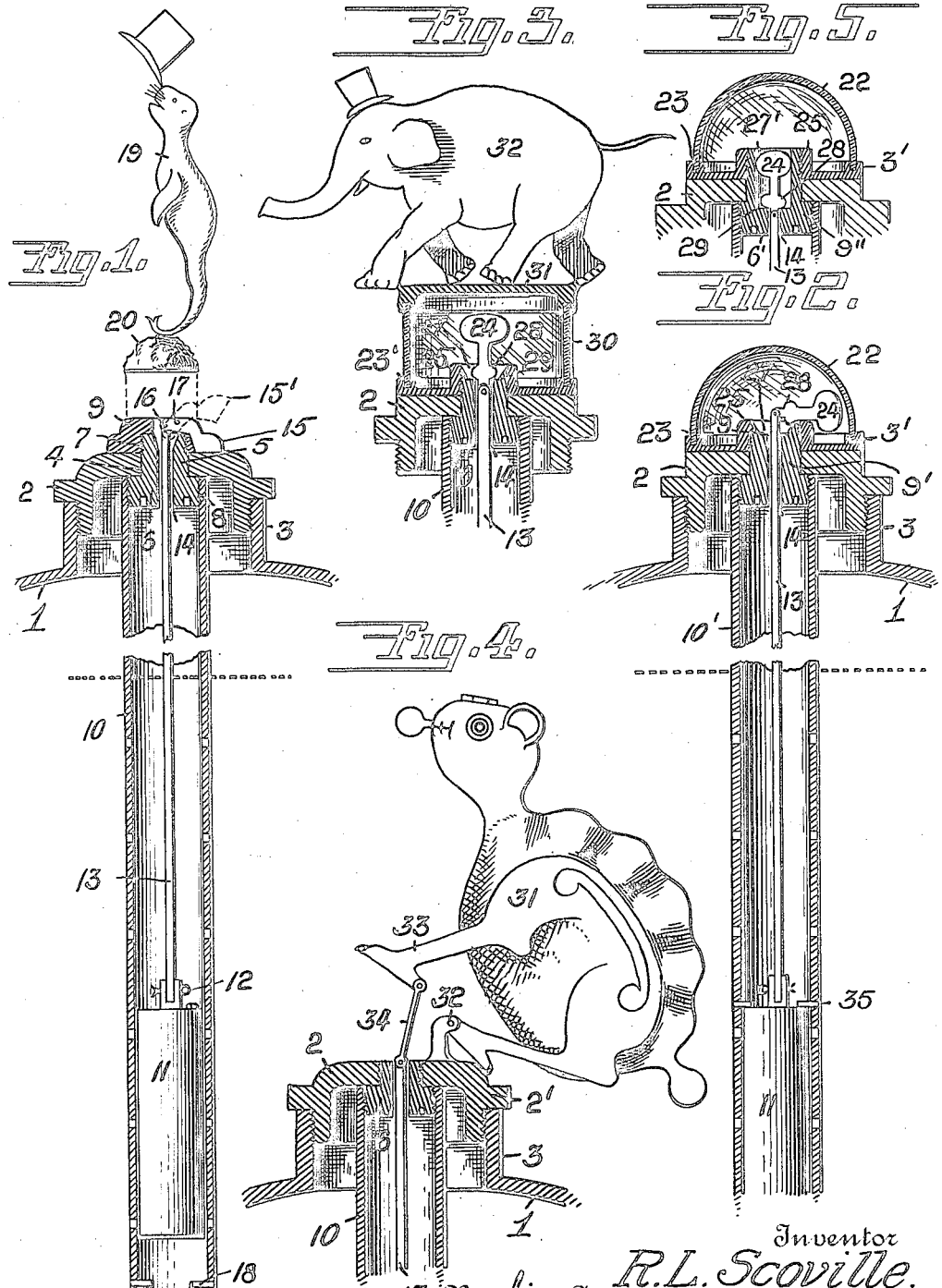

1,435,986

UNITED STATES PATENT OFFICE.

ROYAL L. SCOVILLE, OF NEW YORK, N. Y., ASSIGNOR TO EDWIN M. ROSENBLUTH, OF WALLINGFORD, PENNSYLVANIA.

LOW-WATER INDICATOR FOR AUTOMOBILES.

Application filed January 18, 1921. Serial No. 438,114.

*To all whom it may concern:*

Be it known that I, ROYAL L. SCOVILLE, a citizen of the United States of America, residing at Algonquin Hotel, 59 West 44th Street, New York city, in the county of New York and State of New York, have invented certain new and useful Improvements in a Low-Water Indicator for Automobiles, of which the following is a specification.

This invention relates to automobile radiators of the water cooled type and more especially to indicators of water level for the same. Since the most frequent cause of the overheating of automobile radiators is low water, an indicator which will warn the motorist that the water is getting low would remove the cause of and render unnecessary the use of a thermal meter.

One purpose of the invention is to devise a simple, inexpensive, and ornamental device of this character which will not get out of order and in which the indications of high and low water are strikingly different as to position or other characteristics, or both.

Referring to the drawings in which what I now consider the preferred forms of the invention are shown:

Fig. 1 is a vertical section through one form of the invention showing how it is applied to the filling cap of an automobile radiator.

Fig. 2 is a similar section of a modified form of the invention.

Figs. 3, 4, and 5 are similar sections of the upper portions of three modified forms of the invention.

A portion of an automobile radiator is shown at 1, a usual form of filling cap 2 being shown as threaded on sleeve 3 rising from the radiator. The cap is provided with an aperture 4 through which extends a reduced portion 5 of member 6 having threaded upper and lower portions 7 and 8. A clamp nut 9 shown in the form of a secondary cap is shown as threaded on the upper portion 7, while a hollow cylindrical member 10 is screwed on the lower portion 8. Member 10 is adapted to extend downwardly within the radiator to and below the level which the water should not be allowed to go. Within said cylinder 10 or other equivalent guide member is loosely mounted the float 11 which may be of any suitable material such as sheet copper. Rising from said float and connected thereto as by pin 12 is a stem 13 which passes through and is guided by an aperture 14 in member 6. A semaphore or arm 15 is pivoted adjacent the upper end of the stem as at 16. Said arm may also be pivoted within a slot in nut or cap 9 at 17, so that as the float descends the outer end of the arm is raised out of the slot as indicated in dotted lines at 15'. Preferably the arm is shaped to conform to the outlines of the cap so that when it is down it is invisible from the driver's seat with the foot thereof resting against the top of the filling cap 2 and only comes into view when raised, i. e. when the water is low. Foot 16 also serves by its engagement with cap 2 as a limit stop for the upward movement of the float, while its downward movement may be limited by a pin 18 beneath float 11 in tube 10. My indicator does not show, therefore, the exact level of the water, since certain variations in the water level are permissible, the float remaining entirely immersed, but is only actuated when the water gets very low and, therefore, furnishes a timely and effective warning in such case.

The device may be furnished either with or without ornamental features such as fanciful figure of a seal 19 having a base 20 adapted to fit on and be secured in any manner to the upper portion of cap 9. A slot (not shown) is, of course, provided in said base to permit movement of arm 15.

If desired, to prevent the evaporation of the water or alcohol in the radiator through the aperture 14 or stem 13, a transparent housing 22, shown in Fig. 2 as cone-shaped, may be sealed into an annular groove 23 on cap nut 9'. The form of the arm may also be varied. As shown in this Fig. the pivotal connection between the arm and cap may be omitted, the arm being preferably weighted at its outer end 24 and normally resting or lying sidewise on an annular shoulder 25 of cap 9' when the float is raised. In this position, it will be seen, the arm is subject to jolts and jars of the engine and road and would be kept in a constant state of motion, furnishing a valuable distinguishing characteristic. When the water becomes low, however, the stem 13 descends first revolving arm 9' about shoulder 25 into an almost vertical position and then drawing it downwardly into the enlarged hole 27 in the top of member 3' until shoulders 28 on said arm rest firmly on the shoulders 29 at the base of said hole and the arm assumes a vertical position (see Fig. 3) where it is not noticeable from the driver's seat but held stationary. In this modification no lower stop pin is needed as shoulders 28 act as such, but upper limit stops are shown at 35 in the tube 10' above float 11.

A variation in the form of cover for the device is shown in Fig. 3, wherein cylindrical glass sides 30 are employed surmounted by a top 31 bearing an ornamental or fanciful figure if desired, such as a trick elephant 32. Also if desired such a fanciful figure may be made use of as the indicator itself, as shown in Fig. 4 at 31. According to this modification the figure is pivoted to the cap 2' at 32 and has one foot 33 thereof pivoted to stem 13'' by link 34 so that its position is substantially changed on change in water level, as will be readily apparent.

In Fig. 5 is illustrated a modification substantially similar to that shown in Fig. 2, except that the recess 27' in the top of member 9' is deepened with respect to the length of arm 24, so that the arm is not visible or at least noticeable from the driver's seat when the water is low, as shown in Fig. 5. When the radiator is full the arm will appear substantially as in Fig. 2.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a water level indicator for automobile radiators, the combination with the filling cap, of an arm pivotally mounted with respect thereto and adapted to assume at least two positions, in one of which it remains substantially stationary during the jarring of the automobile and in another it is normally maintained in a state of motion thereby, and a float extending downwardly from said cap connected to said arm to cause the same to change its position when the water in the radiator is too low.

2. In a water level indicator for automobile radiators, the combination with a float, a stem extending upwardly therefrom, a weighted arm pivoted adjacent the upper end of said stem, a stationary abutment adapted to form a fulcrum for the arm whereby the arm is turned into an upright on descent of the float and a transparent dome shaped cover for said arm.

3. In a water level indicator for automobile radiators, the combination with a float, a stem extending upwardly therefrom, a weighted arm pivoted adjacent the upper end of said stem, a stationary abutment adapted to form a rest for the arm in its reclining position permitting movement thereof due to vibration, and means engaging said arm as the float descends and preventing, largely, movement of the arm from the above or like causes.

In testimony whereof I have affixed my signature.

ROYAL L. SCOVILLE.